United States Patent
Akatsuka et al.

(10) Patent No.: US 12,468,311 B2
(45) Date of Patent: Nov. 11, 2025

(54) REMOTE OPERATION CONTROL METHOD, REMOTE OPERATION SYSTEM, AND MOVING BODY

(71) Applicant: TOYOTA JIDOSHA KABUSHIKI KAISHA, Aichi-ken (JP)

(72) Inventors: Kosuke Akatsuka, Mishima (JP); Rio Suda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 190 days.

(21) Appl. No.: 18/465,983

(22) Filed: Sep. 13, 2023

(65) Prior Publication Data

US 2024/0134374 A1 Apr. 25, 2024
US 2024/0231369 A9 Jul. 11, 2024

(30) Foreign Application Priority Data

Oct. 19, 2022 (JP) ................ 2022-167849

(51) Int. Cl.
G05D 1/224 (2024.01)
B64U 10/13 (2023.01)
G05D 1/65 (2024.01)
H04N 7/18 (2006.01)

(52) U.S. Cl.
CPC ........... *G05D 1/224* (2024.01); *G05D 1/2247* (2024.01); *H04N 7/185* (2013.01)

(58) Field of Classification Search
CPC .......... G05D 1/224; G05D 1/02; H04N 17/00; B60W 30/0956; B60W 10/06; B60W 30/16; B64U 10/13; G06V 10/993
See application file for complete search history.

(56) References Cited

U.S. PATENT DOCUMENTS

| | | |
|---|---|---|
| 11,215,982 B2 | 1/2022 | Urano et al. |
| 11,325,618 B2 | 5/2022 | Umeda |
| 2018/0056997 A1* | 3/2018 | Ohmura ................ B60W 10/06 |
| 2019/0137999 A1 | 5/2019 | Taguchi et al. |
| 2020/0209888 A1 | 7/2020 | Sakai et al. |
| 2020/0326702 A1 | 10/2020 | Iwamoto et al. |
| 2020/0377082 A1* | 12/2020 | Nassouri ........... B60W 30/0956 |

(Continued)

FOREIGN PATENT DOCUMENTS

| | | | |
|---|---|---|---|
| CN | 104820424 A * | 8/2015 | ............... G05D 1/02 |
| JP | 2007230525 A * | 9/2007 | ............ B60W 30/16 |

(Continued)

*Primary Examiner* — Yuri Kan

(74) *Attorney, Agent, or Firm* — HAUPTMAN HAM, LLP

(57) ABSTRACT

A remote operation control method for controlling a remote operation of a moving body is provided. A video captured by a camera mounted on the moving body is transmitted to a remote operator terminal on a side of a remote operator remotely operating the moving body. The remote operation control method includes: setting an upper limit speed of the moving body during the remote operation to be lower as a quality of the video transmitted from the moving body to the remote operator terminal becomes lower or as an encoding and decoding time of the video becomes longer; and limiting a speed of the moving body during the remote operation to the upper limit speed or less regardless of an operation amount input by the remote operator.

17 Claims, 6 Drawing Sheets

1: REMOTE OPERATION SYSTEM

(56) References Cited

U.S. PATENT DOCUMENTS

| | | |
|---|---|---|
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |
| 2021/0197808 A1 | 7/2021 | Maeda et al. |
| 2021/0218935 A1* | 7/2021 | Sato ..................... B64U 10/13 |
| 2023/0245559 A1* | 8/2023 | Kobayashi ............ H04N 17/00 701/93 |

FOREIGN PATENT DOCUMENTS

| | | |
|---|---|---|
| JP | 2017-126193 A | 7/2017 |
| JP | 2019-043173 A | 3/2019 |
| JP | 2022144271 A | 10/2022 |
| WO | 2019077739 A1 | 4/2019 |
| WO | 2022009263 A1 | 1/2022 |

\* cited by examiner

REMOTE OPERATION CONTROL METHOD, REMOTE OPERATION SYSTEM, AND MOVING BODY

CROSS-REFERENCES TO RELATED APPLICATION

The present disclosure claims priority to Japanese Patent Application No. 2022-167849, filed on Oct. 19, 2022, the contents of which application are incorporated herein by reference in their entirety.

TECHNICAL FIELD

The present disclosure relates to a remote operation of a moving body.

BACKGROUND ART

Patent Literature 1 discloses that a speed of a vehicle under remote control is limited to a predetermined value or less.

LIST OF RELATED ART

Patent Literature 1: Japanese Laid-Open Patent Application No. JP-2017-126193

SUMMARY

It is conceivable to limit a speed of a moving body during a remote operation (remote driving, remote control, remote assistance) of the moving body. However, if an upper limit speed is uniformly set without considering a situation, the speed of the moving body may be limited more than necessary. This hinders an efficient moving body operation and a smooth remote operation.

An object of the present disclosure is to provide a technique capable of limiting a speed of a moving body during a remote operation according to a situation.

A first aspect is directed to a remote operation control method for controlling a remote operation of a moving body.

A video captured by a camera mounted on the moving body is transmitted to a remote operator terminal on a side of a remote operator remotely operating the moving body.

The remote operation control method includes:
setting an upper limit speed of the moving body during the remote operation to be lower as a quality of the video transmitted from the moving body to the remote operator terminal becomes lower or as an encoding and decoding time of the video becomes longer; and
limiting a speed of the moving body during the remote operation to the upper limit speed or less regardless of an operation amount input by the remote operator.

A second aspect is directed to a remote operation system for a remote operation of a moving body.

A video captured by a camera mounted on the moving body is transmitted to a remote operator terminal on a side of a remote operator remotely operating the moving body.

The remote operation system includes one or more processors.

The one or more processors set an upper limit speed of the moving body during the remote operation to be lower as a quality of the video transmitted from the moving body to the remote operator terminal becomes lower or as an encoding and decoding time of the video becomes longer.

The one or more processors limit a speed of the moving body during the remote operation to the upper limit speed or less regardless of an operation amount input by the remote operator.

A third aspect is directed to a moving body that is a target of a remote operation performed by a remote operator. The moving body includes one or more processors.

The one or more processors transmit a video captured by a camera mounted on the moving body to a remote operator terminal on a side of the remote operator.

The one or more processors set an upper limit speed of the moving body during the remote operation to be lower as a quality of the video transmitted from the moving body to the remote operator terminal becomes lower or as an encoding and decoding time of the video becomes longer.

The one or more processors limit a speed of the moving body during the remote operation to the upper limit speed or less regardless of an operation amount input by the remote operator.

According to the present disclosure, the upper limit speed of the moving body is set according to the quality of the video transmitted from the moving body to the remote operator terminal. When the quality of the video is relatively low, the upper limit speed is set to be relatively low, which enables safer remote operation. On the other hand, when the quality of the video is relatively high, the upper limit speed is set to be relatively high and the speed is not limited more than necessary, which enables the efficient moving body operation and the smooth remote operation.

DETAILED DESCRIPTION

1. Overview of Remote Operation System

A remote operation of a moving body is considered. The remote operation is a concept that includes remote driving, remote control, and remote assistance. Examples of the moving body include a vehicle, a robot, and the like. The vehicle may be an autonomous driving vehicle or may be a vehicle driven by a driver. Examples of the robot include a logistic robot, a work robot, and the like. As an example, in the following description, a case where the moving body being the target of the remote operation is a vehicle will be considered. When generalizing, "vehicle" in the following description shall be deemed to be replaced with "moving body."

Figure 1:
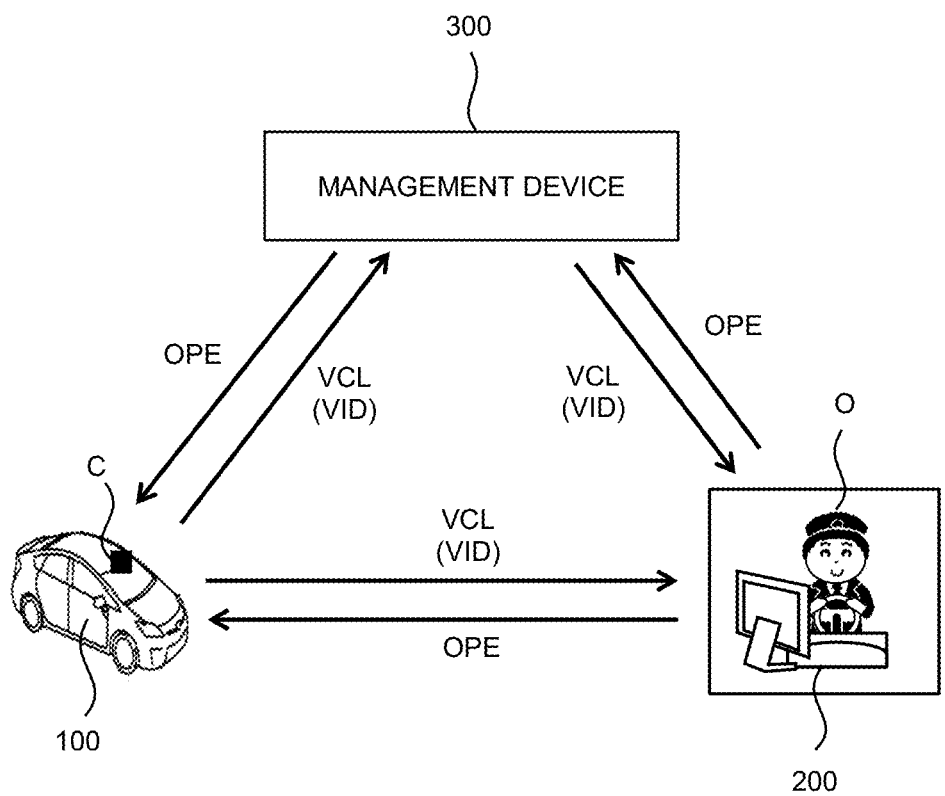
FIG. 1 is a schematic diagram showing a configuration example of a remote operation system according to an embodiment.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used when the remote operator O remotely operates the vehicle 100. The remote operator terminal 200 can also be referred to as a remote cockpit. The management device 300 manages the remote operation system 1. Typically, the management device 300 is a management server on a cloud. The management server may be configured by a plurality of servers that perform distributed processing.

The vehicle 100, the remote operator terminal 200, and the management device 300 are capable of communicating with each other via a communication network. The vehicle 100 and the remote operator terminal 200 can communicate with each other via the management device 300. The vehicle 100 and the remote operator terminal 200 may directly communicate with each other without through the management device 300.

Various sensors including a camera C are mounted on the vehicle 100. The camera C images a situation around the vehicle 100 to acquire a video VID indicating the situation around the vehicle 100. Vehicle information VCL is information acquired by the various sensors and includes the video VID captured by the camera C. The vehicle 100 transmits the vehicle information VCL to the remote operator terminal 200.

The remote operator terminal 200 receives the vehicle information VCL transmitted from the vehicle 100. The remote operator terminal 200 presents the vehicle information VCL to the remote operator O. More specifically, the remote operator terminal 200 includes a display device, and displays the video VID and the like on the display device. The remote operator O views the displayed information, recognizes the situation around the vehicle 100, and performs the remote operation of the vehicle 100. Remote operation information OPE is information relating to the remote operation performed by the remote operator O. For example, the remote operation information OPE includes an operation amount (a steering operation amount, an acceleration operation amount, or a braking operation amount) input by the remote operator O. The remote operator terminal 200 transmits the remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

2. Speed Limiting Process

It is conceivable to limit a speed of the vehicle 100 during the remote operation of the vehicle 100. However, if the upper limit speed is uniformly set without considering the situation, the speed of the vehicle 100 may be limited more than necessary. This hinders efficient vehicle travel and a smooth remote operation. Therefore, the present embodiment proposes a technique capable of limiting the speed of the vehicle 100 during the remote operation according to the situation.

Figure 2:
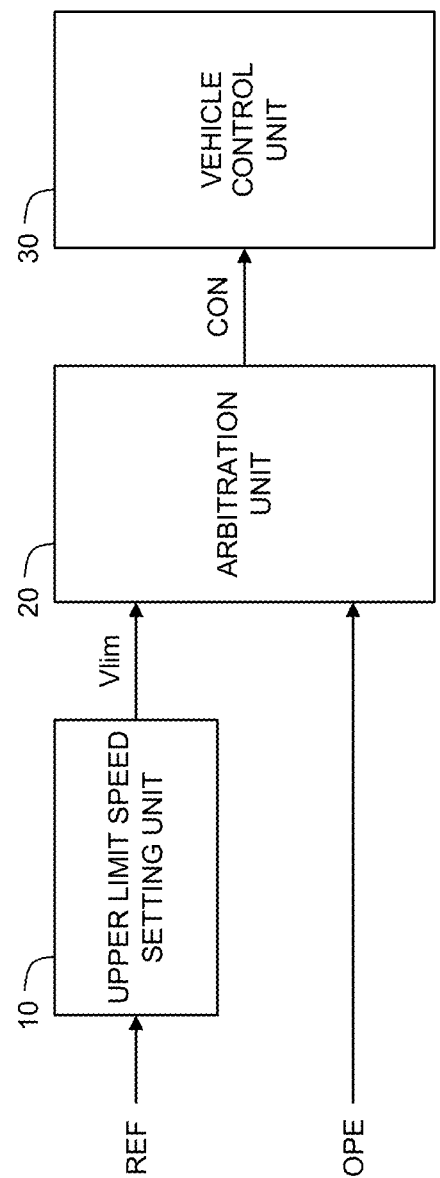
FIG. 2 is a block diagram showing a functional configuration related to a speed limiting process according to an embodiment.

FIG. 2 is a block diagram showing a functional configuration related to a speed limiting process according to the present embodiment. The remote operation system 1 includes an upper limit speed setting unit 10, an arbitration unit 20, and a vehicle control unit 30 as functional blocks.

The upper limit speed setting unit 10 variably sets an upper limit speed Vlim of the vehicle 100 during the remote operation. Reference information REF is information that is considered when setting the upper limit speed Vlim. For example, the reference information REF indicates a situation of the remote operation of the vehicle 100. By considering such the reference information REF, it is possible to set the upper limit speed Vlim according to the situation of the remote operation. Various examples of the reference information REF, that is, various examples of a method of setting the upper limit speed Vlim are possible. Various examples of a method of setting the upper limit speed Vlim will be described later. The upper limit speed setting unit 10 may be included in any of the vehicle 100, the remote operator terminal 200, and the management device 300.

The arbitration unit 20 receives information on the upper limit speed Vlim that is set by the upper limit speed setting unit 10. The arbitration unit 20 also receives the remote operation information OPE. Then, regardless of the operation amount input by the remote operator O, the arbitration unit 20 limits the speed of the vehicle 100 during the remote operation to the upper limit speed Vlim or less. That is to say, the arbitration unit 20 selects, as a final request speed, a lower one of the speed according to the remote operation information OPE and the upper limit speed Vlim.

For example, the arbitration unit 20 is included in the vehicle 100. In this case, the arbitration unit 20 receives the remote operation information OPE sent from the remote operator terminal 200. For example, the remote operation information OPE includes the accelerator operation amount input by the remote operator O. The arbitration unit 20 calculates an operator request speed based on the accelerator operation amount. Then, the arbitration unit 20 selects a lower one of the operator request speed and the upper limit speed Vlim as the final request speed.

As another example, the arbitration unit 20 may be included in the remote operator terminal 200. In this case, the arbitration unit 20 corrects the remote operation information OPE in advance before transmitting it to the vehicle 100 so that the speed of the vehicle 100 is limited to the upper limit speed Vlim or less. For example, the arbitration unit 20 calculates an operator request speed based on the accelerator operation amount input by the remote operator O. Further, the arbitration unit 20 selects a lower one of the operator request speed and the upper limit speed Vlim as the final request speed. In this case, the request speed selected by the arbitration unit 20 is included in the remote operation information OPE transmitted from the remote operator terminal 200 to the vehicle 100.

The arbitration unit 20 may calculate a request acceleration together with the request speed. More specifically, based on a current speed of the vehicle 100 and the upper limit speed Vlim, the arbitration unit 20 calculates a first acceleration for making the speed of the vehicle 100 equal to the upper limit speed Vlim. In addition, the arbitration unit 20 calculates am operator request acceleration based on the accelerator operation amount input by the remote operator O. Then, the arbitration unit 20 selects a lower one of the operator request acceleration and the first acceleration as a final request acceleration.

The arbitration unit 20 outputs control information CON including the final request speed and the final request acceleration to the vehicle control unit 30. The vehicle control unit 30 is included in the vehicle 100 and controls the speed and acceleration of vehicle 100 in accordance with the control information CON.

Hereinafter, various examples of the method of setting the upper limit speed Vlim will be described.

3. Examples of Upper Limit Speed Setting

3-1. First Example

The vehicle 100 monitors a state of communication with the remote operator terminal 200 and detects occurrence of congestion. The congestion detection method is a well-known technique and is not particularly limited. For example, it is possible to detect occurrence of congestion based on a packet loss state or a delay state. When the congestion occurs and the communication speed decreases, the vehicle 100 executes "congestion control" in order to suppress a communication delay and to avoid communication interruption. More specifically, the vehicle 100 reduces the data transmission amount by reducing the image quality of the video VID to be transmitted to the remote operator terminal 200. For example, the vehicle 100 reduces the resolution of the video VID in an encoding process. As another example, the vehicle 100 reduces the frame rate of the video VID in the encoding process. Such the congestion control makes it possible to suppress the communication delay and to avoid the communication interruption.

However, when the congestion control is performed in the vehicle 100, the image quality of the video VID displayed on the display device of the remote operator terminal 200 also deteriorates. As a result, visibility of the video VID may decrease, and it may be difficult for the remote operator O to recognize the situation around the vehicle 100. In this case, it is preferable to limit the speed of the vehicle 100 for safety.

In view of the above, in the first example, the upper limit speed setting unit 10 variably sets the upper limit speed Vlim of the vehicle 100 according to the quality of the video VID transmitted from the vehicle 100 to the remote operator terminal 200. The reference information REF is information related to the quality of the video VID transmitted from the vehicle 100 to the remote operator terminal 200. The quality of the video VID includes at least one of a resolution and a frame rate of the video VID. The vehicle 100 that transmits the video VID can acquire the information related to the quality of the video VID. The remote operator terminal 200 can also acquire the information related to the quality of the video VID based on the received video VID. When the video VID is transferred to the remote operator terminal 200 via the management device 300, the management device 300 can also acquire the information regarding the quality of the video VID. Therefore, the upper limit speed setting unit 10 may be included in any of the vehicle 100, the remote operator terminal 200, and the management device 300.

Figure 3:
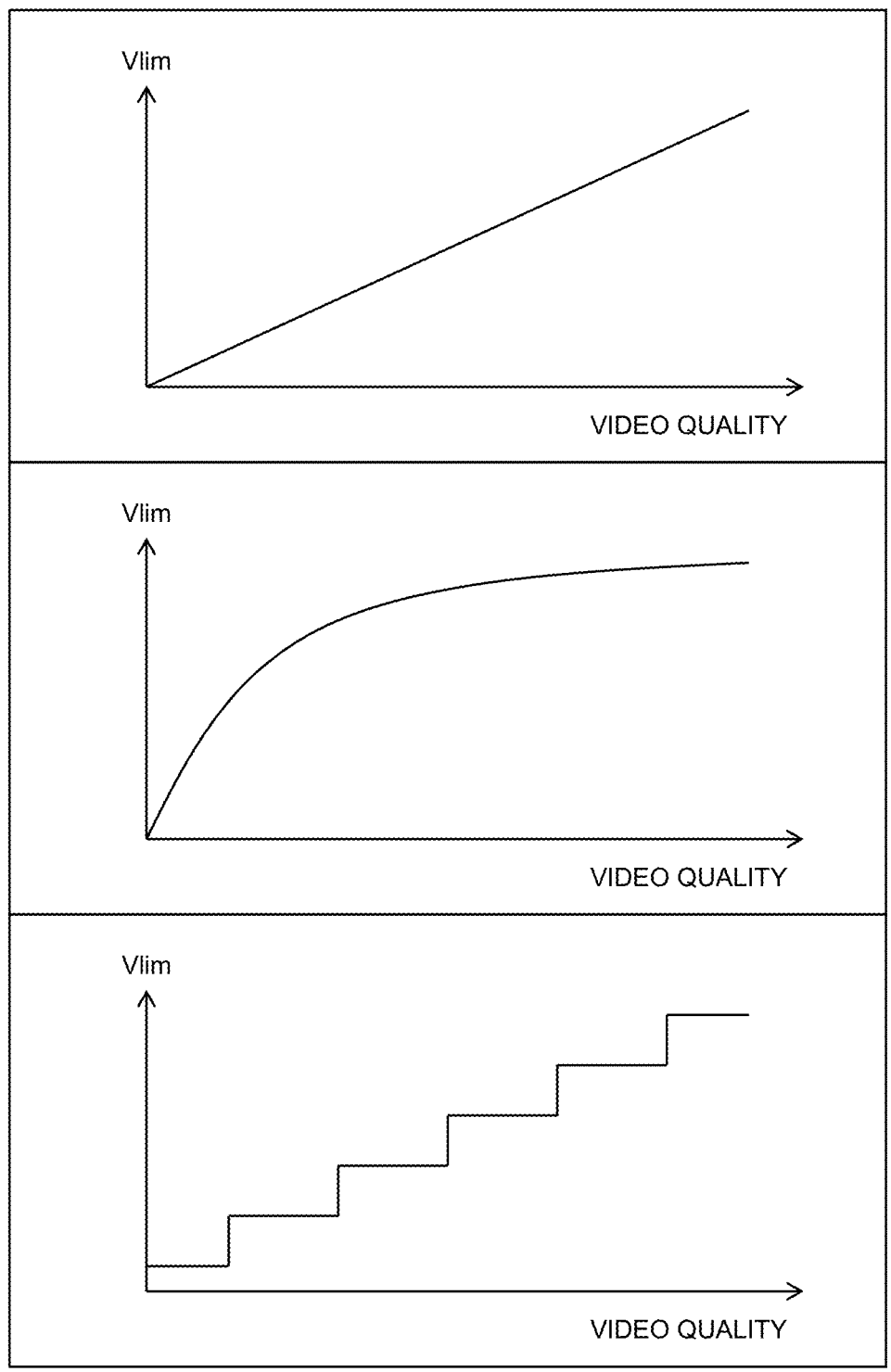
FIG. 3 is a conceptual diagram for explaining an example of an upper limit speed setting process according to an embodiment.

FIG. 3 is a conceptual diagram for explaining setting examples of the upper limit speed Vlim in the first example. The upper limit speed setting unit 10 sets the upper limit speed Vlim to be lower as the quality of the video VID becomes lower, and sets the upper limit speed Vlim to be higher as the quality of the video VID becomes higher. The upper limit speed Vlim may change linearly or non-linearly according to the quality of the video VID. The upper limit speed Vlim may be changed stepwise.

As described above, according to the first example, the upper limit speed Vlim of the vehicle 100 is set according to the quality of the video VID transmitted from the vehicle 100 to the remote operator terminal 200. When the quality of the video VID is relatively low, the upper limit speed Vlim is set to be relatively low, which enables safer remote operation. On the other hand, when the quality of the video VID is relatively high, the upper limit speed Vlim is set to be relatively high and the speed is not limited more than necessary, which enables the efficient moving body operation and the smooth remote operation.

3-2. Second Example

A delay time of the communication between the vehicle 100 and the remote operator terminal 200 varies depending on a line state and the like. When the delay time increases, a difference between the video VID viewed by the remote operator O and the current video increases, and thus a time until the remote operation by the remote operator O is actually reflected in behavior of the vehicle 100 increases. In such a case, it is preferable to limit the speed of the vehicle 100 for safety.

In view of the above, in the second example, the upper limit speed setting unit 10 variably sets the upper limit speed Vlim of the vehicle 100 according to the delay time of the communication between the vehicle 100 and the remote operator terminal 200. The reference information REF is information related to the delay time of the communication between the vehicle 100 and the remote operator terminal 200. For example, when the upper limit speed setting unit 10 is included in the vehicle 100, the upper limit speed setting unit 10 can grasp the delay time based on a reception state of the remote operation information OPE from the remote operator terminal 200. As another example, when the upper limit speed setting unit 10 is included in the remote operator terminal 200, the upper limit speed setting unit 10 may grasp the delay time based on a reception state of the vehicle information VCL from the vehicle 100.

The upper limit speed setting unit 10 sets the upper limit speed Vlim to be lower as the delay time increases, and sets the upper limit speed Vlim to be higher as the delay time decreases. For example, the upper limit speed setting unit 10 sets the upper limit speed Vlim such that a free running distance of the vehicle 100 during the delay time falls within a certain distance. As a result, the same effect as in the first example can be obtained.

3-3. Third Example

An encoding and decoding time of the video VID also contributes to the delay of the video VID, that is, the difference between the video VID seen by the remote operator O and the current one. In view of the above, in the third example, the upper limit speed setting unit 10 variably sets the upper limit speed Vlim of the vehicle 100 according to the encoding and decoding time of the video VID. The reference information REF is the encoding and decoding time of the video VID, and is obtained in the vehicle 100 or the remote operator terminal 200. The upper limit speed setting unit 10 sets the upper limit speed Vlim to be lower as the encoding and decoding time of the video VID becomes longer. As a result, the same effect as in the second example can be obtained.

3-4. Fourth Example

Figure 4:
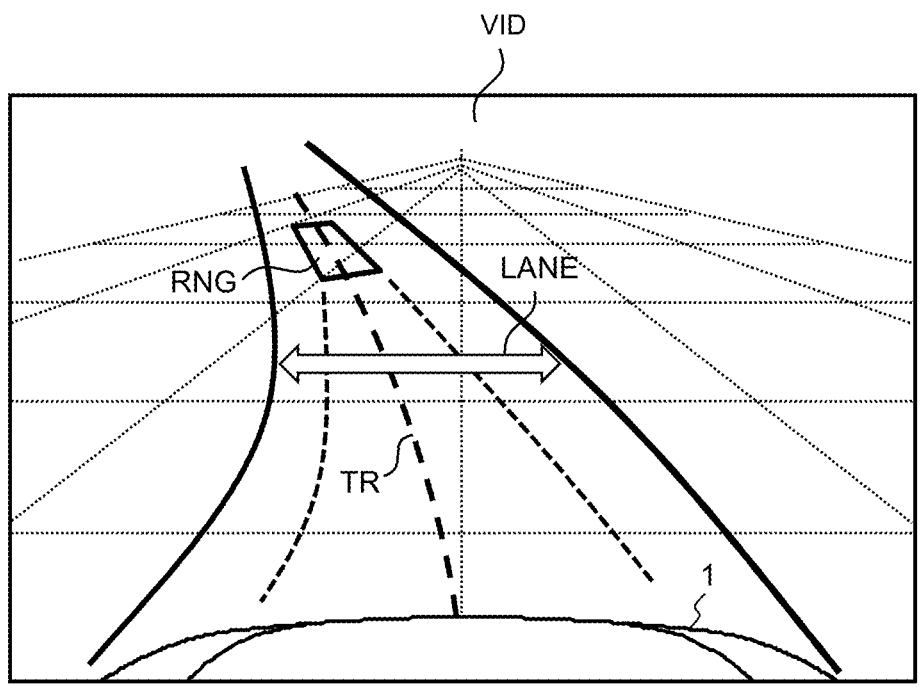
FIG. 4 is a conceptual diagram for explaining another example of an upper limit speed setting process according to an embodiment.

As shown in FIG. 4, the remote operator terminal 200 may superimpose and display an estimated future position (an estimated trajectory TR and/or an estimated passing range RNG) of the vehicle 100 on the video VID. Such the estimated future position can be estimated based on the operation amount (the steering operation amount, the accelerator operation amount, or the brake operation amount) input by the remote operator O and the speed of the vehicle 100. When the estimated future position according to the operation performed by the remote operator O frequently deviates from a lane, the remote operation skill of the remote operator O may not be high. In such a case, it is preferable to limit the speed of the vehicle 100.

In view of the above, in the fourth example, the upper limit speed setting unit 10 sets the upper limit speed Vlim based on the number of times that the estimated future position of the vehicle 100 deviates from a lane in which the vehicle 100 is traveling. The reference information REF includes, for example, the estimated future position of the vehicle 100. The estimated future position of the vehicle 100 can be calculated based on the remote operation information OPE, and may be calculated by the vehicle 100 or may be calculated by the remote operator terminal 200. When the upper limit speed setting unit 10 is included in the vehicle 100, the upper limit speed setting unit 10 can recognize a position of the lane in which the vehicle 100 is traveling based on the current position of the vehicle 100 and lane arrangement information registered in the map information. When the upper limit speed setting unit 10 is included in the remote operator terminal 200, the upper limit speed setting unit 10 may extract the lane position from the video VID by using a method such as semantic segmentation.

The upper limit speed setting unit 10 counts the number of times that the estimated future position of the vehicle 100 deviates from the lane in which the vehicle 100 is traveling in a past fixed period of time. Then, the upper limit speed setting unit 10 sets the upper limit speed Vlim to be lower as the number of times of deviation in the past fixed period of time increases. The upper limit speed Vlim may change linearly or non-linearly according to the number of deviations. Also in the case of the fourth example, the same effect as in the case of the first example described above can be obtained.

3-5. Fifth Example

In a fifth example, the upper limit speed setting unit 10 sets a speed limit of a road on which the vehicle 100 is traveling as the upper limit speed Vlim. The reference information REF is information regarding the speed limit of the road on which the vehicle 100 is traveling. For example, the vehicle 100 analyzes the image captured by the camera C to recognize a speed limit sign installed on the road and to read the speed limit indicated by the speed limit sign. As another example, the speed limit may be registered in advance in high-precision map information.

3-6. Sixth Example

In a sixth example, the reference information REF is information of the upper limit speed Vlim determined by an external organization. For example, the upper limit speed Vlim is arbitrarily determined by a remote operation business operator. For example, the reference information REF is provided by the management device 300. The upper limit speed setting unit 10 sets the upper limit speed Vlim based on the reference information REF.

3-7. Seventh Example

As long as there is no contradiction, a combination of two or more of the first to sixth examples described above is also possible.

4. Example of Vehicle

4-1. Configuration Example

Figure 5:
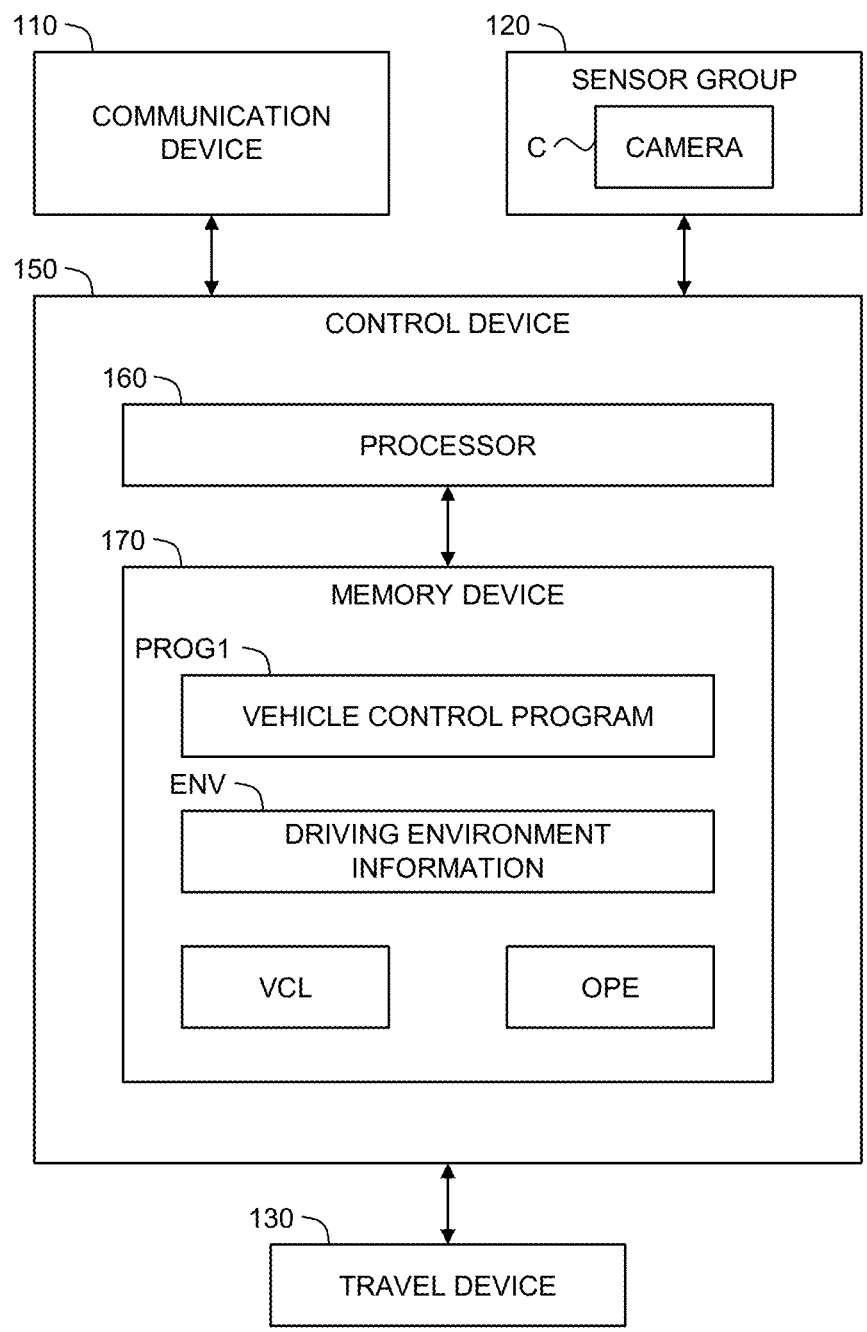
FIG. 5 is a block diagram showing a configuration example of a vehicle according to an embodiment.

FIG. 5 is a block diagram showing a configuration example of the vehicle 100. The vehicle 100 includes a communication device 110, a sensor group 120, a travel device 130, and a control device 150.

The communication device 110 communicates with the outside of the vehicle 100. For example, the communication device 110 communicates with the remote operator terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include the camera C, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, a gear position sensor, and the like. The position sensor detects a position and an orientation of the vehicle 100. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter, simply referred to as processors 160) and one or more memory devices 170 (hereinafter, simply referred to as memory devices 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like.

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

4-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the video VID captured by the camera C. The surrounding situation information further includes object information regarding an object around the vehicle 100. Examples of the object around the vehicle 100 include a pedestrian, another vehicle (a preceding vehicle, a vehicle, or the like), a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information.

4-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

4-4. Processing Related to Remote Operation

Hereinafter, the case where the remote operation of the vehicle 100 is performed will be described. The control device 150 communicates with the remote operator terminal 200 via the communication device 110.

The control device 150 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the video VID). The vehicle information VCL may further include the vehicle state information and the vehicle position information.

In addition, the control device 150 receives the remote operation information OPE from the remote operator terminal 200. The remote operation information OPE is information regarding the remote operation performed by the remote operator O. For example, the remote operation information OPE includes the operation amount input by the remote operator O. The control device 150 performs the vehicle travel control in accordance with the received remote operation information OPE.

Further, the control device 150 executes the congestion control described in the above section 3-1 as necessary. In the congestion control, the control device 150 reduces the image quality (e.g., resolution, frame rate) of the video VID to be transmitted to the remote operator terminal 200.

The control device 150 may have the function of the upper limit speed setting unit 10 described in the above Section 2 and Section 3. The control device 150 may have the function of the arbitration unit 20 described above. The control device 150 may have the function of the vehicle control unit 30 described above.

5. Configuration Example of Remote Operator Terminal

Figure 6:
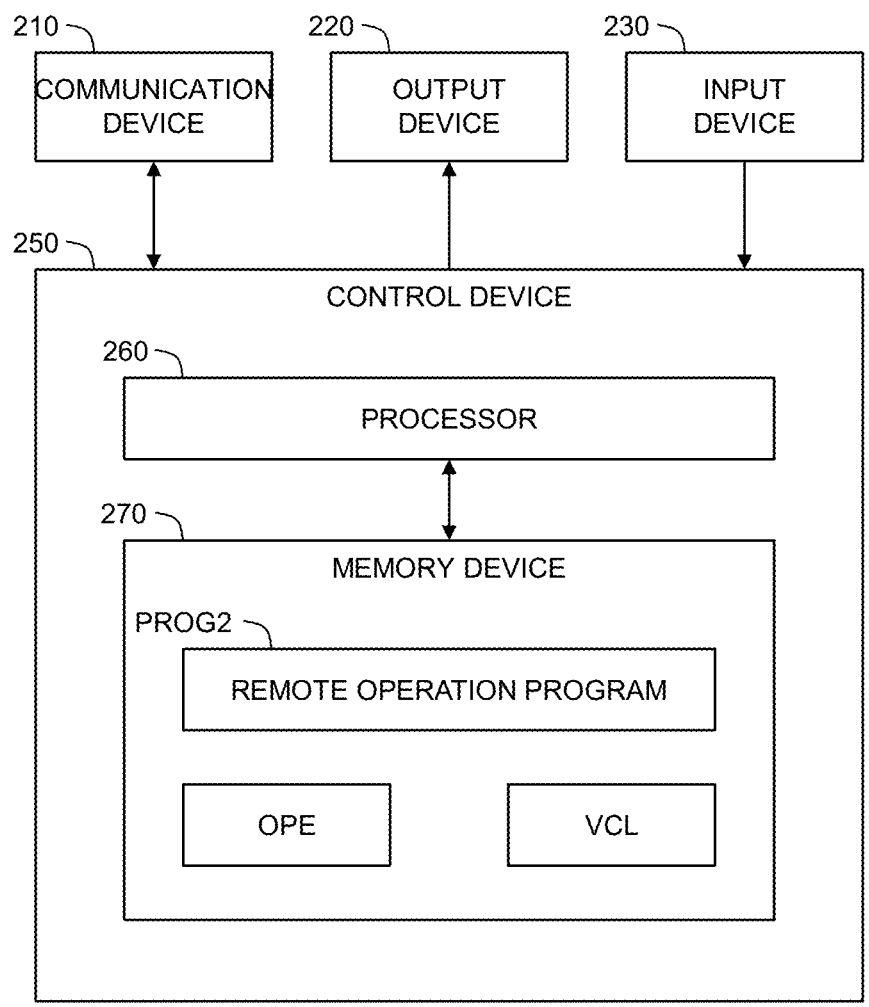
FIG. 6 is a block diagram showing a configuration example of a remote operator terminal according to an embodiment.

FIG. 6 is a block diagram showing a configuration example of the remote operator terminal 200. The remote operator terminal 200 includes a communication device 210, an output device 220, an input device 230, and a control device 250.

The communication device 210 communicates with the vehicle 100 and the management device 300.

The output device 220 outputs a variety of information. For example, the output device 220 includes a display device. The display device presents a variety of information to the remote operator O by displaying a variety of information. As another example, the output device 220 may include a speaker.

The input device 230 receives an input from the remote operator O. For example, the input device 230 includes a remote operation member operated by the remote operator O when remotely operating the vehicle 100. The remote operation member 230 includes a steering wheel, an accelerator pedal, a brake pedal, a direction indicator, and the like.

The control device 250 controls the remote operator terminal 200. The control device 250 includes one or more processors 260 (hereinafter, simply referred to as a processor 260) and one or more memory devices 270 (hereinafter, simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a nonvolatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL including the video VID on the display device. The remote operator O is able to recognize the state of the vehicle 100 and the surrounding situation based on the vehicle information VCL displayed on the display device.

The remote operator O operates the remote operation member of the input device 230. The operation amount of the remote operation member is detected by a sensor provided in the remote operation member. The control device 250 generates the remote operation information OPE reflecting the amount of operation of the remote operation member performed by the remote operator O. Then, the control device 250 transmits the remote operation information OPE to the vehicle 100 via the communication device 210.

The control device 250 may have the function of the upper limit speed setting unit 10 described in the above Section 2 and Section 3. The control device 250 may have the function of the arbitration unit 20 described above.

What is claimed is:

1. A remote operation control method for controlling a remote operation of a moving body, the remote operation control method comprising:
    capturing a video captured by a camera mounted on the moving body and transmitting the captured video is transmitted to a remote operator terminal on a side of a remote operator remotely operating the moving body;
    transmitting remote operation information from the remote operator terminal to the moving body, the remote operation information including a steering operation amount, an acceleration operation amount, and a braking operation amount that are input by the remote operator; and
    controlling the moving body in accordance with the remote operation information received from the remote operator terminal,
    the remote operation control method further comprising:
    acquiring information of a speed of the moving body by using a speed sensor mounted on the moving body;
    acquiring the remote operation information including the steering operation amount, the acceleration operation amount, and the braking operation amount that are input by the remote operator;
    estimating a future position of the moving body based on the steering operation amount, the acceleration operation amount, the braking operation amount, and the speed of the moving body;
    acquiring the video captured by the camera mounted on the moving body;
    extracting a position of a lane that is shown in the video and in which the moving body travels;
    superimposing the estimated future position of the moving body on the video including the lane to count a number of times that the estimated future position deviates from the lane in a past fixed period of time;
    setting an upper limit speed of the moving body during the remote operation to be lower as the number of times increases; and
    limiting the speed of the moving body during the remote operation to the upper limit speed or less regardless of the remote operation information.

2. A remote operation system for a remote operation of a moving body, the remote operation system comprising: a camera, a remote operator terminal, and one or more processors, wherein
    a video captured by the camera mounted on the moving body is transmitted to the remote operator terminal on a side of a remote operator remotely operating the moving body,
    remote operation information including a steering operation amount, an acceleration operation amount, and a braking operation amount that are input by the remote operator is transmitted from the remote operator terminal to the moving body,
    the moving body is controlled in accordance with the remote operation information received from the remote operator terminal, and
    the one or more processors are configured to:
        acquire information of a speed of the moving body by using a speed sensor mounted on the moving body;
        acquire the remote operation information including the steering operation amount, the acceleration operation amount, and the braking operation amount that are input by the remote operator;
        estimate a future position of the moving body based on the steering operation amount, the acceleration operation amount, the braking operation amount, and the speed of the moving body;
        acquire the video captured by the camera mounted on the moving body;
        extract a position of a lane that is shown in the video and in which the moving body travels;
        superimpose the estimated future position of the moving body on the video including the lane to count a number of times that the estimated future position deviates from the lane in a past fixed period of time;
        set an upper limit speed of the moving body during the remote operation to be lower as the number of times increases; and
        limit the speed of the moving body during the remote operation to the upper limit speed or less regardless of the remote operation information.

3. The remote operation control method according to claim 1, wherein
    the position of the lane that is shown in the video is extracted by applying semantic segmentation to the video.

4. The remote operation system according to claim 2, wherein
    the one or more processors are further configured to extract the position of the lane that is shown in the video by applying semantic segmentation to the video.

5. The remote operation control method according to claim 1, wherein the remote operation control method further comprises:
    setting the upper limit speed of the moving body according to a delay time of a communication between the moving body and the remote operator terminal.

6. The remote operation control method according to claim 5, wherein
    the setting comprises setting the upper limit speed to be lower as the delay time increases, and setting the upper limit speed to be higher as the delay time decreases.

7. The remote operation control method according to claim 6, wherein
    the setting comprises setting the upper limit speed such that a free running distance of the moving body during the delay time falls within a certain distance.

8. The remote operation control method according to claim 1, wherein the remote operation control method further comprises:
    setting the upper limit speed of the moving body according to a quality of the video transmitted from the moving body to the remote operator terminal.

9. The remote operation system according to claim 2, wherein the one or more processors are further configured to set the upper limit speed of the moving body according to a delay time of a communication between the moving body and the remote operator terminal.

10. The remote operation system according to claim 9, wherein
the one or more processors are further configured to set the upper limit speed to be lower as the delay time increases, and set the upper limit speed to be higher as the delay time decreases.

11. The remote operation system according to claim 10, wherein
the one or more processors are further configured to set the upper limit speed such that a free running distance of the moving body during the delay time falls within a certain distance.

12. The remote operation system according to claim 2, wherein
the one or more processors are further configured to set the upper limit speed of the moving body according to a quality of the video transmitted from the moving body to the remote operator terminal.

13. A non-transitory computer readable medium storing thereon a program for controlling a remote operation of a moving body, wherein
a video captured by a camera mounted on the moving body is transmitted to a remote operator terminal on a side of a remote operator remotely operating the moving body,
remote operation information including a steering operation amount, an acceleration operation amount, and a braking operation amount that are input by the remote operator is transmitted from the remote operator terminal to the moving body,
the moving body is controlled in accordance with the remote operation information received from the remote operator terminal, and
the program, when executed by one or more processors, causes the one or more processors to:
acquire information of a speed of the moving body by using a speed sensor mounted on the moving body;
acquire the remote operation information including the steering operation amount, the acceleration operation amount, and the braking operation amount that are input by the remote operator;
estimate a future position of the moving body based on the steering operation amount, the acceleration operation amount, the braking operation amount, and the speed of the moving body;
acquire the video captured by the camera mounted on the moving body;
extract a position of a lane that is shown in the video and in which the moving body travels;
superimpose the estimated future position of the moving body on the video including the lane to count a number of times that the estimated future position deviates from the lane in a past fixed period of time;
set an upper limit speed of the moving body during the remote operation to be lower as the number of times increases; and
limit the speed of the moving body during the remote operation to the upper limit speed or less regardless of the remote operation information.

14. The non-transitory computer readable medium according to claim 13, wherein the program, when executed, causes the one or more processors further to
set the upper limit speed of the moving body according to a delay time of a communication between the moving body and the remote operator terminal.

15. The non-transitory computer readable medium according to claim 14, wherein the program, when executed, causes the one or more processors further to
set the upper limit speed to be lower as the delay time increases, and set the upper limit speed to be higher as the delay time decreases.

16. The non-transitory computer readable medium according to claim 15, wherein the program, when executed, causes the one or more processors further to
set the upper limit speed such that a free running distance of the moving body during the delay time falls within a certain distance.

17. The non-transitory computer readable medium according to claim 13, wherein the program, when executed, causes the one or more processors further to
set the upper limit speed of the moving body according to a quality of the video transmitted from the moving body to the remote operator terminal.

\* \* \* \* \*